Figure 1:
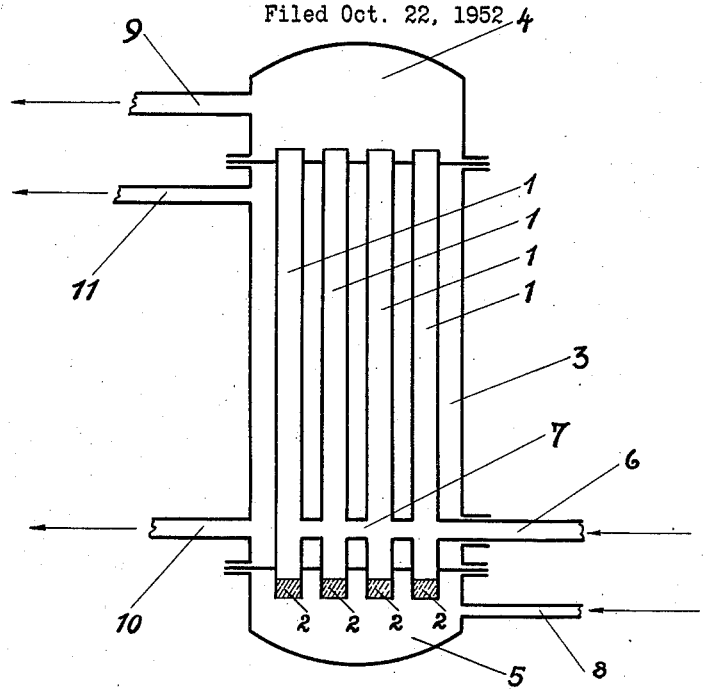

INVENTORS
Otto Grosskinsky
Helmut Umbach

2,898,190
METHOD OF PRODUCING AMMONIUM SULFATE AND AMMONIUM THIOSULFATE

Otto Grosskinsky and Helmut Umbach,
Dortmund-Eving, Germany

Application October 22, 1952, Serial No. 316,162

Claims priority, application Germany November 22, 1951

2 Claims. (Cl. 23—115)

The present invention relates to a novel process and an apparatus for making useful ammonium salts, especially ammonium sulfate and ammonium thiosulfate.

It has been known that ammonium sulfide is capable of being converted into ammonium sulfate by treating aqueous ammonium sulfide solutions with air at elevated temperature and under superatmospheric pressure. Although the conversion is practically quantitative, the aforesaid process has not been introduced into practice thanks to the extraordinary slowness of the reaction. In a copending U.S. application Serial No. 151,316, filed March 22, 1950, and now abandoned, we have described and claimed a process according to which aqueous ammonia containing hydrogen sulfide is caused to drizzle over layers of large surface area material (Raschig rings, grainy active carbon and the like) at elevated temperature and in the presence of air of superatmospheric pressure, the rate of the conversion of ammonium sulfide into ammonium sulfate being considerably raised hereby so that this process is susceptible of being carried out on a commercial scale.

Furthermore, a process has been known for the purpose of removing hydrogen sulfide from aqueous ammonia such as obtained in coking and similar plants, this process consisting essentially in causing air of atmospheric pressure to bubble in finely divided condition and at elevated temperature through a coherent column of aqueous ammonia containing hydrogen sulfide. The gist of this process is to convert the volatile hydrogen sulfide into nonvolatile substances, such as elementary sulfur and ammonium salts, so that the free ammonia remaining in excess is capable of being purified by distillation without being contaminated by volatile sulfur compounds. A disadvantage of this process consists in the excessive slowness of the conversion and in the fact that the hydrogen sulfide is converted in an uncontrollable manner into a mixture of elementary sulfur, sulfate and thionates of ammonia, such mixture being of low commercial value, of course, all the more since very small amounts of ammonium sulfate are formed per se in this process.

It is an object of the present invention to provide a process according to which the hydrogen sulfide present in aqueous ammonia obtained preferably in the carbonization of bituminous coal or similar processes is rapidly converted into uniform chemical substances, preferably ammonium sulfate or, if so desired, ammonium thiosulfate, and to recover pure gaseous or aqueous excess ammonia, if present.

Another object of the present invention is to provide a process according to which the conversion of hydrogen sulfide into ammonium sulfate or ammonium thiosulfate is carried out more rapidly and in more simply constructed apparatus than will be achieved according to our aforesaid copending application Serial No. 151,316.

Still another object of our invention is to carry out the conversion of ammonium sulfide or similar sulfur compounds by way of an oxidizing treatment in such a manner that the gaseous oxidizing agent, preferably air, is completely utilized.

Other objects and advantages of our invention will become apparent in and by the following description.

With the above objects in view, our new process consists, in brief, in causing gaseous oxidizing agents, preferably air to bubble in finely divided condition and at elevated temperature through a coherent column of aqueous ammonia containing hydrogen sulfide, substantially as pointed out in the third paragraph of this specification. Unlike the known art, however, we effectuate the bubbling through of the gaseous agent under superatmospheric pressure. In this manner the hydrogen sulfide present is rapidly and completely converted into ammonium sulfate. Moreover, we are capable to convert the hydrogen sulfide into ammonium thiosulfate substantially free from elementary sulfur and other ammonium salts, this being achieved by controlling the amount of the reacting oxidizing agent in proportion to that of the hydrogen sulfide and/or the contacting time of the reactants.

Preferably we start from an ammonia water enriched with hydrogen sulfide. In addition, our new process is not limited to the processing of ammonium sulfide; other oxidizable and water soluble sulfur compounds, such as ammonium polysulfides or ammonium thionates, may be treated in the same manner. Besides, in our process the ammonia may be replaced, partially or completely, by other alkaline substances, such as the hydroxides of sodium or potassium, without leaving the scope of our invention.

Practically the process is carried out in a vertical tube or an upright cylindrical vessel into which the liquid is fed, thus forming a coherent column of liquid. The oxidizing agent, preferably air or other gases containing free oxygen, is introduced at the bottom of the reaction vessel and finely distributed in any known manner, such as stirring, forcing the gaseous agents through porous ceramic material forming the bottom of the vessel, or the like.

The reaction being distinctly exothermic, means are to be provided in order to control the reaction temperature. Accordingly the reaction vessel is surrounded by a jacket through which a gaseous or liquid cooling or heating agent, preferably steam or water, can be conducted in accordance with the requirements of temperature.

A preferable method of carrying out our process consists in employing a bunch of vertical tubes surrounded in common by a jacket, the entire device thus forming a sort of vertically arranged fire tube boiler. The ammonia liquid is fed into the vertical tubes, the lower ends of said tubes being closed by stoppers made of porous ceramic material through which the gaseous oxidizing agent, preferably air, is forced by means of a compressing device. During the oxidizing process the liquid treated is kept under superatmospheric pressure, say 20 to 30 atmospheres, this being substantially achieved by controlling the supply of the reactants and the eduction of the reaction products accordingly. At the beginning of the conversion, steam or hot water is conducted through the jacket in order to attain the reaction temperature. As soon as the reaction has started, the aforesaid heating agents are replaced by cooling agents, such as water, and the cooling of the reaction tubes or the maintaining of the reaction temperature desired may be effectuated in such a manner that steam of superatmospheric pressure is produced in the jacket so that the entire system acts as a boiler, as pointed out above.

The liquid and the gaseous oxidizing agent can be conducted in counter-current or in co-current. Theoretically the counter-current method is the most favorable, following the principle of contacting, at the top of the liquid column, fresh liquid with gaseous agents containing no more (or but little) oxygen, whereas, downwards, the percentage of nonoxidized substances in the liquid drops and the oxygen percentage of the respective gaseous agent increases, so that—according to theory—at the bottom of the column fresh gases of whole oxygen percentage are contacted with liquid having undergone the complete oxidation desired. However, in practice the counter-current method is available only in case of liquids moving downwards very slowly; in case of liquids moving downwards more rapidly, said method is less advantageous thanks to vortex motions occurring and disturbing the counter-current principle, thus resulting in poorer yields.

Accordingly, as we have found, a most favorable embodiment of our process consists in carrying out the same in two or more stages connected in series in such a manner that gas and liquid are conducted in co-current within the single stages and in counter-current with reference to the entire system. In many cases two stages will be sufficient, the first stage being dimensioned and operated in such a manner that the entire hydrogen sulfide is converted into thiosulfate in said stage, whereas in the second stage the thiosulfate is converted into sulfate, as illustrated by Example 3 given hereinafter. This two stage system allows to completely utilize the oxygen contained in the gas, the costs for gas compressing being lowered accordingly. If need be, the second stage may be subdivided into two or more other stages, a three stage or a multiple stage system resulting in this way (the first stage being invariably the thiosulfate stage). The subdivision of the second stage offers the further advantage of considerably increasing the throughput per time unit, as shown by Example 4.

Small gas bubbles moving upwards through a liquid incline to agglomerate more or less, according to the quality of the liquid. It is a further advantage of our multiple stage system that the gas is forced to pass a series of porous stoppers of the kind mentioned above or other analogous means so that the gas is finely divided again and again before entering the single stages, this method warranting an extraordinarily intimate contact between gas and liquid.

During the oxidation process a part of the water forming a constituent of the crude starting liquid is evaporated, escaping together with a part of the excess ammonia, so that the salt solution formed is subjected to a more or less intensive evaporation. It is good practice, therefore, to start from an almost concentrated salt solution and to proceed in such a manner that a highly concentrated solution may be continuously tapped off, the costs of evaporating said salt solution being considerably lowered in this way.

If necessary, the oxidation of the hydrogen sulfide may be promoted by adding small amounts of catalysts, acting as carriers of oxygen, to the ammonia liquid, such catalysts being f.i. salts of heavy metals, such as Cu, Co, Ni. Finely grained active carbon is suitable also as a promotor offering the advantage, moreover, of being readily removable by filtration.

In the accompanying drawing, Fig. 1 is a diagrammatic longitudinal section of an apparatus especially suitable for carrying out our process on a commercial scale, showing a fire tube boiler of the kind pointed out above. 1 are vertical tubes, closed below by stoppers 2 made of porous ceramic material. 3 is a jacket surrounding in common the tubes 1, said jacket being provided above and below with hoods 4 and 5. The crude ammonia water containing $H_2S$ is fed through 6 into the tubes 1, said tubes communicating by a cross connection 7. Compressed air is conducted through 8 into the lower hood 5, passing the stoppers 2 and moving upwards in finely divided condition through tubes 1. The treated liquid and the waste gases leave through 9, being subsequently cooled and separated from each other. Water is fed into the jacket 3 through 10, the steam produced leaving through 11. The apparatus described is susceptible of being operated continuously, of course.

Figure 2:
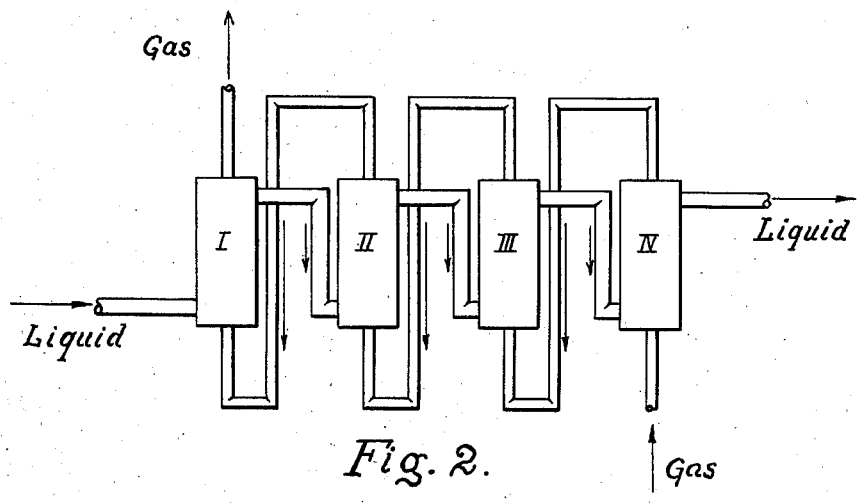

Fig. 2 is a diagram showing the manner of connecting the reaction stages in a four stage system. The figure is self-explanatory, showing that in the single stages the reactants (gas and liquid) are conducted in co-current, whereas with reference to the entire system they move in counter-current. In systems comprising more or less than four stages the connection is arranged accordingly, of course.

The following are specific examples of the invention, designed to illustrate but not to limit the same.

Example I

This example demonstrates the production of ammonium thiosulfate in a pilot plant consisting substantially of a single vertical tube (length 10 m., clear diameter 20 cm.) surrounded by a jacket for heating up and cooling, respectively. Near the lower end of said tube, 240 litres of ammonia water containing 183 gms. $NH_3$, 110 gms. $H_2S$ and 69 gms. $CO_2$ per litre, are fed in per hour, so that 26.4 kgs. $H_2S$ pass the tube per hour. The lower end of said tube is closed by a propper made of porous ceramic material through which 83–84 normal m.$^3$ of air (=1–2% above the theoretical amount) are forced in per hour, being subdivided into a multitude of fine bulbs moving upwards in the liquid. In the tube a pressure of 25 superatmospheres is maintained. The liquid is first heated up to reaction temperature by introducing steam into the jacket. When the reaction has started, the steam is replaced by hot water, and the reaction temperature is regulated and kept at 150–160° C. by means of the water evaporated under pressure in the jacket. During the reaction, fresh ammonia liquid containing $H_2S$ is continuously fed into the tube. At the top of said reaction tube gas and liquid leave, being subsequently cooled and separated from each other. The exit liquid contains the whole sulfur employed as ammonium sulfide in the form of ammonium thiosulfate and some ammonium sulfate, 53–55 kgs. thiosulfate (=94–97.5% of the theoretical amount) and 2.5–6.0 kgs. sulfate (=2.5–6% of the theoretical amount) being formed per hour. The waste gas is practically free from oxygen, so that 99–100% of the oxygen employed is utilized. In the reaction tube 314 litres volume) 24.7 kgs. sulfur present as sulfide are converted per hour to ammonium thiosulfate and some ammonium sulfate, the specific capacity of the apparatus thus being 78.5 gms. S converted per litre and per hour.

Example II

This example demonstrates the production of ammonium sulfate, apparatus, composition of the ammonia water, pressure, reaction temperature, and method of setting going the apparatus being the same as in example I. 70 litres ammonia water and 57–58 normal m.$^3$ of air (=16–18% above the theoretical amount) are passed through per hour. The liquid leaving the reaction tube contains the whole sulfur introduced as ammonium sulfide in the form of ammonium sulfate, 29.5–30 kgs. ammonium sulfate (=99–100% of the theoretical amount) being formed per hour. In this case the specific capacity of the apparatus is 23 gms. S converted per litre and per hour.

Example III

This example demonstrates the production of ammonium sulfate in which in a first stage the hydrogen sulfide is preliminarily converted into ammonium thiosulfate and subsequently into ammonium sulfate in a second stage. In this way a complete utilization of the air employed is achieved, the compressing costs of the air being lowered accordingly.

In both stages single reaction tubes are employed, constructed and provided with jackets as pointed out in Example I.

In the first tube the sulfide contained in the fresh ammonia water is substantially oxidized to thiosulfate by means of the air leaving the second tube wherein about 50% of the oxygen contained in the fresh air is consumed to convert the thiosulfate into sulfate. The oxidation reactions take place according to the following equations:

2nd stage:

$$(NH_4)_2S_2O_3 + 2NH_3 + H_2O + 4O_2 = 2(NH_4)_2SO_4 + 2O_2$$

1st stage:

$$2(NH_4)_2S + 2O_2 = (NH_4)_2S_2O_3 + 2NH_3 + H_2O$$

The dimensions of the two reaction tubes are the following:

|  | length, m. | clear diameter, cm. | volume, litres |
| --- | --- | --- | --- |
| 2nd stage | 8 | 20 | 250 |
| 1st stage | 10 | 10 | 78.5 |
| Total |  |  | 328.5 |

In both tubes the pressure is 25 superatmospheres and the reaction temperature 150–160° C. The composition of the ammonia liquid is the same as in Example I, the throughput of ammonia water being 72 litres (=8 kgs. $H_2S$) per hour, the air supply 50–51 normal m.³ per hour. After cooling, the liquid leaving the second stage contains in the form of ammonium sulfate the whole sulfur introduced as sulfide. 31 kgs. ammonium sulfate are produced per hour. The waste gas leaving the first stage is practically free from oxygen, 99–100% of said oxygen being utilized.

The capacity of the two stage system is 7.5 kgs. S converted per hour and referred to a total apparatus volume of 328.5 litres, i.e. 22.8 gms. S per litre and per hour.

*Example IV*

This example demonstrates the production of ammonium sulfate in a four stage apparatus, in the first stage the $H_2S$ being substantially converted into thiosulfate according to Example III. Unlike Example III, the second (sulfate) stage is subdivided into a system of three separate stages connected in series with each other and the first (thiosulfate) stage as shown by Fig. 2.

Composition of the ammonia liquid, pressure and reaction temperatures in the four stages are the same as in the foregoing examples. The dimensions of the four reaction tubes (constructed as pointed out in Example I) are the following:

|  | length, m. | clear diameter, cm. | volume, litres |
| --- | --- | --- | --- |
| 1st (thiosulfate) stage | 10 | 16 | 200 |
| 2nd (sulfate) stage | 8 | 20 | 251 |
| 3rd (sulfate) stage | 7 | 20 | 220 |
| 4th (sulfate) stage | 6 | 20 | 189 |
| Total |  |  | 860 |

The throughput of ammonia water is 260 litres per hour, 182–183 normal m.³ of air being introduced during the same time. After cooling, the liquid leaving the fourth (final) stage contains in the form of ammonium sulfate the whole sulfur fed in as sulfide, so that 111 kgs. ammonium sulfate are formed per hour. The waste gas leaving the first stage is practically free from oxygen; 99–100% of the oxygen employed is utilized.

The capacity of the four stage apparatus is 27 kgs. S converted per hour, referred to a total apparatus volume of 860 litres, the specific capacity being 31.4 gms. S per litre and per hour. Compared with Example III, the specific capacity is considerably higher, the ratio being 100:138.

We cannot clearly explain the reason of the raised specific capacity of our multiple stage system as illustrated by Example IV, but most probably this reason is due to the enlarged surface area between gas and liquid, caused by the repeated dividing of the gas when passing porous material before entering the single stages.

During the conversion no supply of external heat is required, save the heat necessitated for attaining the reaction temperature. On the contrary, in the apparatus heat is developed sufficient not only for maintaining the reaction temperature (150–160° C.) but also for producing steam in the jackets, so that 1000 kgs. steam are obtained per m.³ of treated ammonia water, this steam being sufficient for evaporating the entire sulfate solution and to recover solid salt.

We do not desire our present invention to be restricted to the special embodiments herein described, on the contrary the invention may be variously embodied within the scope of the claims hereinafter made.

What is claimed as new and desired to be secured by Letters Patent is:

1. A method of producing an ammonium salt from hydrogen sulfide contained in an aqueous ammonia liquid, comprising the steps of continuously passing at elevated temperature a gaseous oxidizing agent in finely divided condition upwardly through coherent columns of an ammonia liquid being under pressure and containing hydrogen sulfide in a series of stages in a manner such that in each individual stage said gaseous oxidizing agent and said aqueous ammonia liquid are conducted in cocurrent, while with reference to the entire system of stages said gaseous oxidizing agent and said aqueous ammonia liquid move in counter-current to each other, thereby forming an aqueous liquid containing substantially only one of the ammonium salts selected from the group consisting of ammonium sulfate and ammonium thiosulfate; continuously withdrawing said aqueous liquid; and recovering said ammonium salt.

2. A method of producing an ammonium salt from hydrogen sulfide contained in an aqueous ammonia liquid, comprising the steps of continuously passing at elevated temperature a gaseous oxidizing agent in finely divided condition upwardly through coherent columns of an ammonia liquid being under pressure of 20–30 atmospheres and containing hydrogen sulfide in a series of stages in a manner such that in each individual stage said gaseous oxidizing agent and said aqueous ammonia liquid are conducted in cocurrent, while with reference to the entire system of stages said gaseous oxidizing agent and said aqueous ammonia liquid move in countercurrent to each other, thereby forming an aqueous liquid containing substantially only one of the ammonium salts selected from the group consisting of ammonium sulfate and ammonium thiosulfate; continuously withdrawing said aqueous liquid; and recovering said ammonium salt.

References Cited in the file of this patent

UNITED STATES PATENTS

| 731,758 | Daub | June 23, 1903 |
| --- | --- | --- |
| 1,091,234 | Mittasch | Mar. 24, 1914 |
| 1,567,755 | Rusberg | Dec. 29, 1925 |
| 1,639,905 | Sperr | Aug. 23, 1927 |
| 1,719,610 | Isenberg | July 2, 1929 |
| 1,747,634 | Isenberg | Feb. 18, 1930 |
| 1,868,843 | Overdick | July 26, 1932 |
| 1,986,889 | Fulton | Jan. 8, 1935 |
| 2,044,167 | Heimann | June 16, 1937 |
| 2,085,924 | Riegler | July 6, 1937 |
| 2,312,217 | King et al. | Feb. 23, 1943 |
| 2,599,067 | Otto | June 3, 1952 |

(Other references on following page)

FOREIGN PATENTS

| | | |
|---|---|---|
| 12,979 | Great Britain | of 1913 |
| 511,673 | Great Britain | Aug. 22, 1939 |

OTHER REFERENCES

Wolfkovitch and Tzyrlin: Journal of the Chemical Industry, v. 6, No. 18 and No. 19, pages 1323–1332 and pages 1403–1409, "Oxidation of Ammonium Sulfite and Preparation of Ammonium Sulfate From Gaseous Sulfurous Anhydride, Ammonia, and Water Vapor" from the Russian text by A. T. Weber, Koppers Construction Co., Koppers Building, Pittsburgh, Pa., January 15, 1932, pages 2, 3, 4, 15, 16, 17, 18.